United States Patent

Wollney et al.

[15] 3,646,680

[45] Mar. 7, 1972

[54] ORTHODONTIC FORCE MODEL

[72] Inventors: John L. Wollney, 1 South Ardmore Avenue, Villa Park, Ill. 60181; Ronald W. Jawor, 5425 W. Ferdinand, Chicago, Ill. 60644; Norman L. Sanders, 8001 Edgewater Drive, North Riverside, Ill. 60546

[22] Filed: July 30, 1970

[21] Appl. No.: 64,905

[52] U.S. Cl. .................................................. 32/71
[51] Int. Cl. ............................................. G09b 19/00
[58] Field of Search ............................... 32/14 R, 71

[56] References Cited

UNITED STATES PATENTS 3,422,536  1/1969  Garson ................................. 32/71
2,539,278  1/1951  Schwehr et al. ..................... 32/71

Primary Examiner—Robert Peshock
Attorney—Gerald M. Newman

[57] ABSTRACT

An orthodontic force model comprising a pair of simulated teeth suspended by springs and a conventionally shaped orthodontic face bow for applying a variable force to the teeth simulating the force which may be applied by extra-oral orthodontic apparatus. Application of the external forces causes tooth displacement which may be observed and compared to the normal tooth position. The model may be used for demonstrating and explaining the orthodontic process to an orthodontic patient and is also a useful experimental tool for the orthodontist.

23 Claims, 5 Drawing Figures

PATENTED MAR 7 1972

Inventors:
John L. Wollney,
Ronald W. Jawor
Norman L. Sanders.

By Gerald M. Newman Atty.

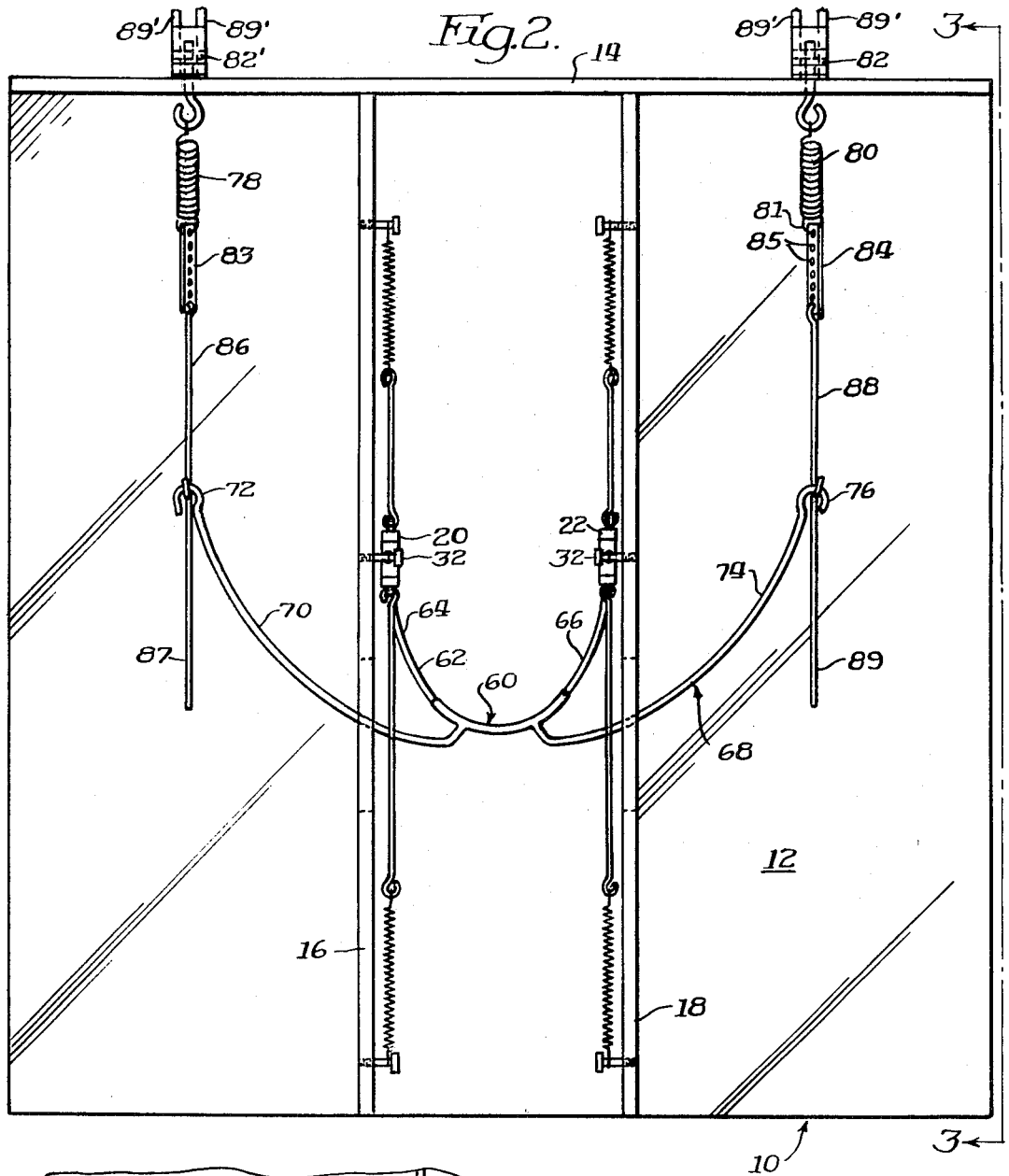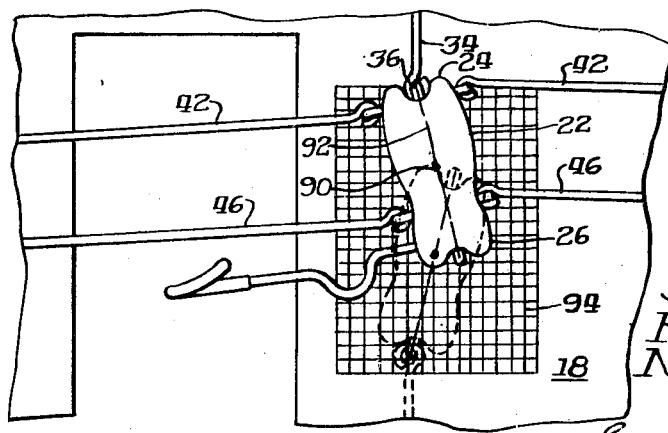

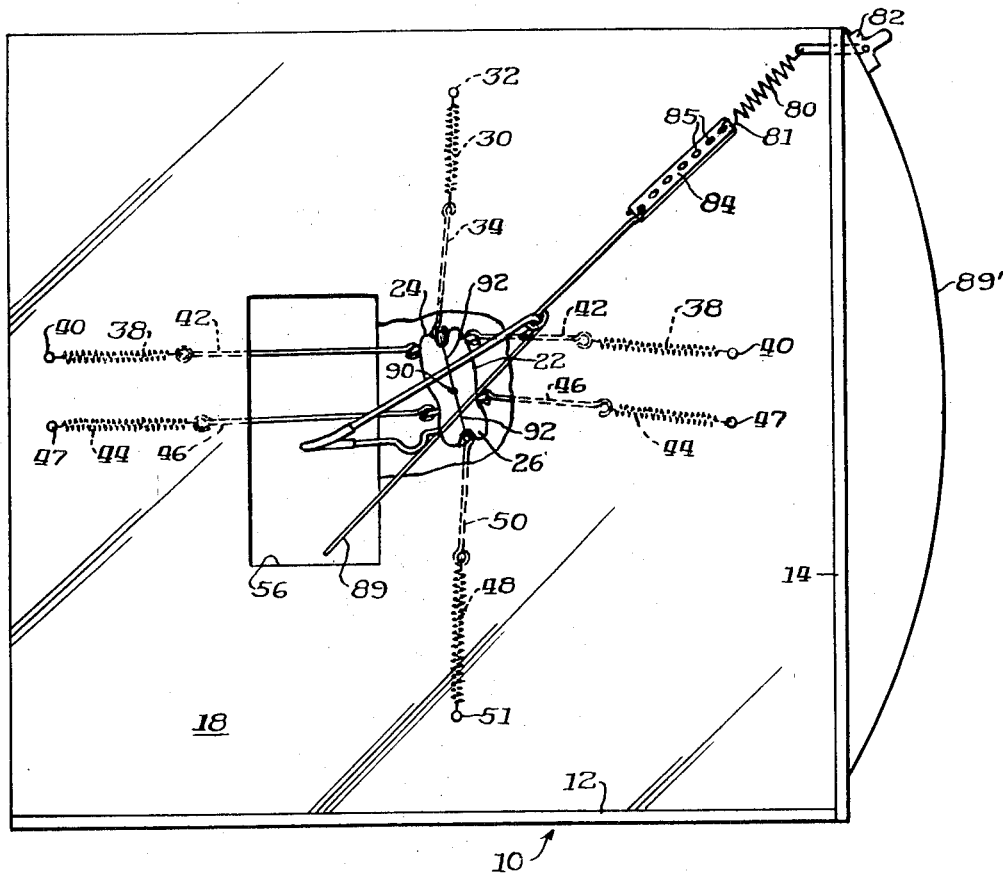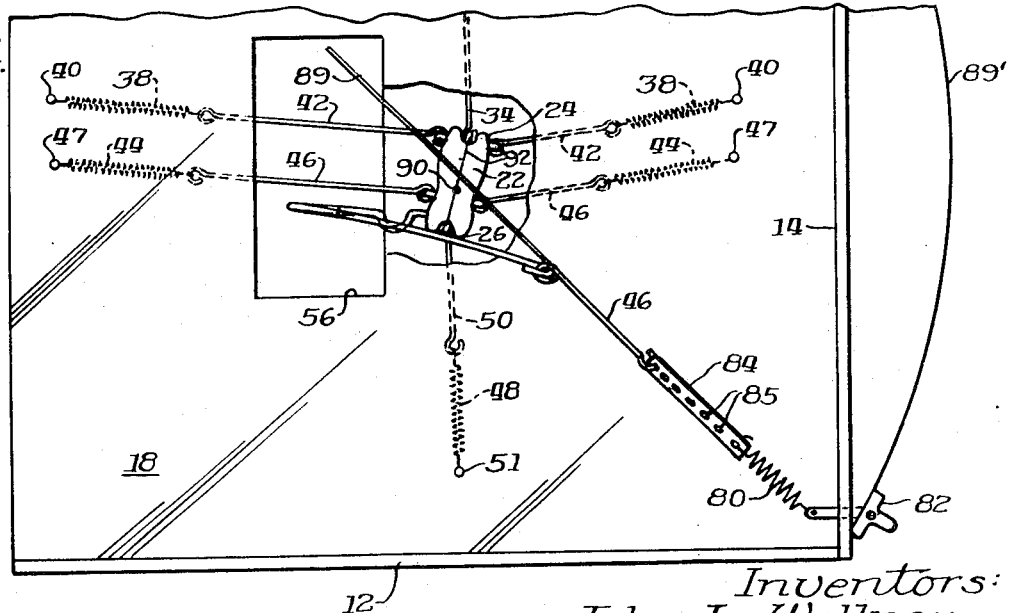

ORTHODONTIC FORCE MODEL

FIELD OF THE INVENTION

This invention relates in general to the specialty of orthodontia in the field of dentistry. In particular, this invention relates to orthodontic apparatus for demonstrating the direction of tooth displacement which may be expected responsive to application of various external forces to the tooth through the use of conventional extra-oral orthodontic apparatus.

DESCRIPTION OF THE PRIOR ART

The use of various external forces, both intraoral and extraoral, for moving and displacing teeth to achieve a desired tooth correction is well known in the field of orthodontia. While the direction of tooth movement can often be accurately calculated and predicted based upon a thorough knowledge of engineering statics, when more than one force is applied to a tooth or when the direction through which a force is applied is varied to introduce force couples or moments, determination of the expected result becomes much more difficult, although such determination is still within the capability of the experienced orthodontist. However, explaining the predicted movement of one or more teeth to a patient and to orthodontic students has heretofore been extremely difficult due to the unavailability of realistic orthodontic force demonstration apparatus.

SUMMARY OF THE INVENTION

This invention obviates the above-mentioned problems and difficulties by providing a model for accurately and realistically demonstrating the results which may be expected upon applying external force to one or more teeth of a human jaw.

In accordance with the invention a pair of simulated teeth, such as the 6 year molars occupying similar locations on each side of the medial line, are suspended for independent movement by a number of springs which simulate normal support of the molars by the muscle, tissue and bone structure of a human jaw. The spaced apart molars are connected by the inner bow of a conventional orthodontic face bow. The outer face bow extends generally outwardly of the patient's cheeks and its terminal ends are connected to external forces, such as springs. The tension of each spring and the direction through which the spring force acts on the face bow and the teeth may be readily varied by the user to demonstrate the movement of each molar responsive to the variation of the force magnitude and direction. The face bow is secured to the teeth in a manner permitting it to be readily removed to enable the orthodontist to manipulate the inner bow relative to the outer bow as is conventionally done when it is desired to achieve a particular tooth correction.

A stationary crosshatch structure is provided adjacent each tooth for visually observing the movement or displacement of the tooth responsive to application of the force.

In addition to providing a useful tool for demonstrating the orthodontic process to patients, the orthodontic force model of the invention is extremely useful to the orthodontist for experimenting with the relationship between the inner and outer bows and the directions in which extraoral forces should be applied to the molars, the latter being a function of the headgear style employed. By means of the model of the invention an orthodontist can readily demonstrate to his patients the different results which will be achieved by using high headgear as compared to using cervicle headgear, or vice versa.

Accordingly, the primary object of this invention is to provide an orthodontic model for demonstrating to a patient predicted tooth movement responsive to application of external force.

Another object of this invention is to provide a force model for use by an orthodontist to experiment with applying forces of variable magnitude and direction to a tooth in order to prescribe proper orthodontic apparatus to achieve a desired tooth correction.

Another object of this invention is to provide an orthodontic force model comprising a pair of simulated teeth suspended in a manner simulating support of the teeth in a patient's jaw and means for applying forces of variable magnitude and direction to the teeth for demonstrating the expected tooth movement to a patient.

A further object of this invention is to provide a lifelike simulated model of a pair of teeth for demonstrating the expected tooth movement or displacement responsive to applying external forces of variable magnitude and direction.

Additional objects of this invention will become apparent to those versed in the art upon an understanding of the following detailed description of the orthodontic force model of the invention taken in conjunction with the accompanying drawings in which a preferred embodiment of the invention is shown and wherein:

FIG. 2 is a slightly enlarged top plan view of the orthodontic force model shown in FIG. 1.

FIG. 3 is a right side elevational view of the orthodontic force model as viewed along line 3—3 of FIG. 2 with the crosshatch graph structure omitted for clarity;

Figure 1:
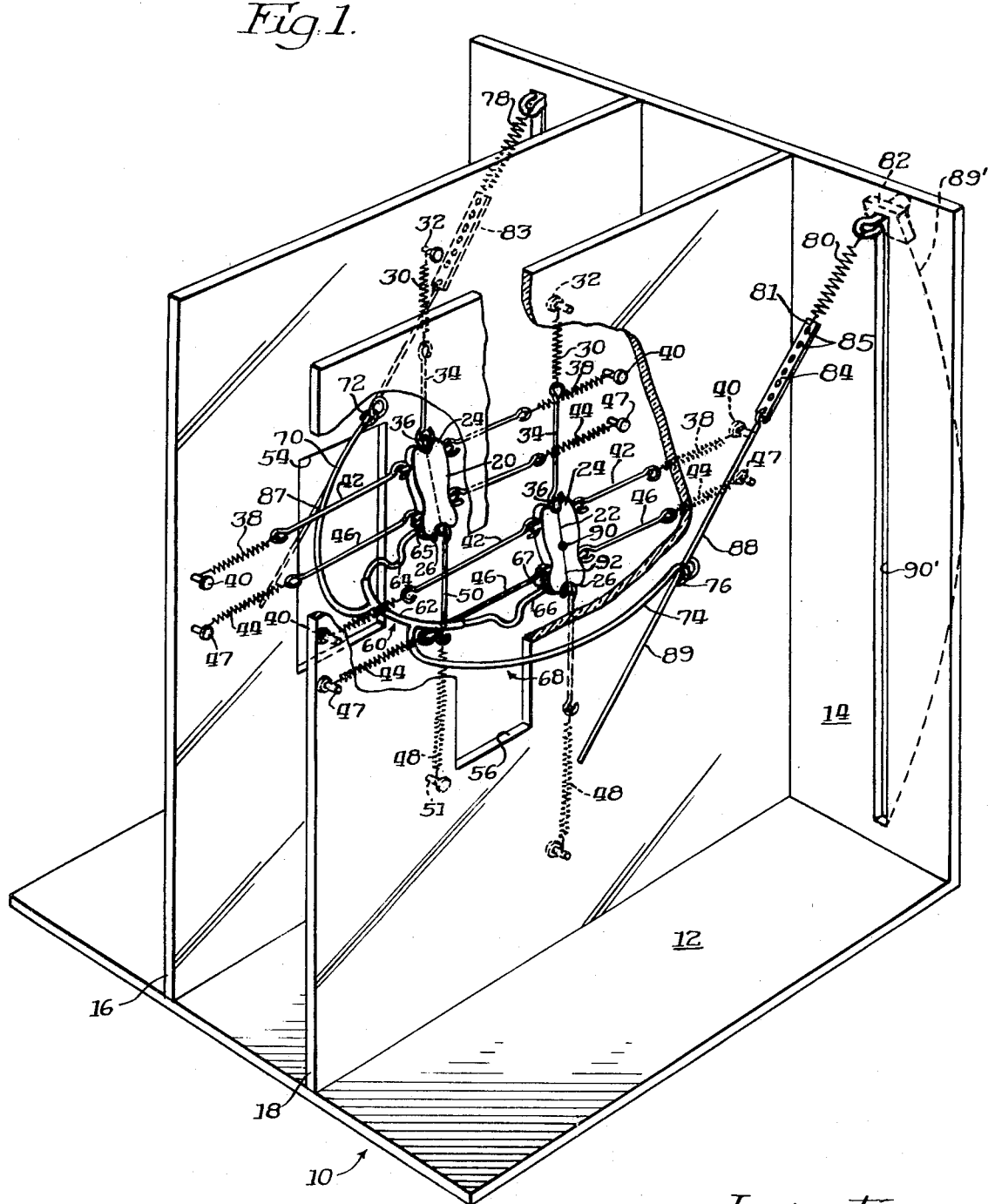
FIG. 1 is an isometric view of the orthodontic force model of the invention with a portion of wall 18 deleted for clarity.

FIG. 4 is a right side elevational view similar to that shown in FIG. 3 with the force being applied to the face bow from a lower direction; and FIG. 5 is a greatly enlarged right side elevational view of the force model illustrating the crosshatch graph. The tooth orientation responsive to the force being applied from the direction illustrated in FIG. 3 of the drawings is shown in solid lines. The tooth orientation responsive to the force being applied from the direction shown in FIG. 4 is shown in phantom.

DETAILED DESCRIPTION OF THE INVENTION

Referring now to FIGS. 1, 2 and 3 of the drawings the orthodontic force model of the invention, generally referred to by reference numeral 10, includes a base or bottom wall 12, a back wall 14 disposed perpendicular to the base, and a pair of spaced apart parallel sidewalls 16 and 18. Backwall 14 is cemented or otherwise fastened to the bottom wall and sidewalls 16 and 18 are each similarly fastened to both the back and the side walls forming a rigid, stable structure. Each of walls 12, 14, 16 and 18 is preferably fabricated of transparent material, such as Lucite plastic, which creates an extremely pleasing and attractive assembly. The transparency of the walls enables the user to observe the movement and displacement of each tooth in a manner as will be described in detail hereinafter.

A simulated tooth 20 is supported on the interior surface of wall 16 and a second simulated tooth 22 is supported on the interior surface of wall 18. Teeth 20 and 22 simulate the 6 year molars normally found on opposite sides of the medial line in the upper jaw.

In accordance with the invention, each molar is suspended or supported for movement on its respective wall in a manner which simulates support of the molar by the muscle, tissue and bone structure of a human jaw. Since the teeth are supported on the walls in the identical manner, the same reference numeral will be used to identify similar elements.

Specifically, each tooth is vertically supported by upper springs 30 having one end attached to screws 32 secured in walls 16 and 18 and having the other end attached to stiff connecting wires 34. The free end of each connecting wire 34 is secured to the root 24 of a tooth such as by means of screw eyes 36. Each tooth is supported in the lateral direction by a pair of upper lateral springs 38 having one end secured to screws 40 anchored in walls 16 and 18 and having the other end secured to stiff connecting wires 42. Wires 42 are fastened to the mesial and distal sides of the tooth by means of screw eyes to provide a loose, flexible connection. Lower lateral springs 44, connecting wires 46 and screws 47 are similarly provided to insure a high degree of stability. Finally, the crown portion of each tooth is secured by means of springs 48 connecting wires 50 and screws 51. Each spring is lightly tensed to simulate to some degree the tooth support structure of a human jaw.

Wall 16 includes a rectangularly shaped opening 54 slightly forward of the suspended position of tooth 20. Wall 18 includes a similarly shaped and similarly located opening 56 so that when viewing the structure from one side or the other, openings 54 and 56 are aligned.

In accordance with the invention, a conventionally shaped orthodontic face bow 60 is provided. Face bow 60 may be of the same size as that normally employed in connection with extraoral orthodontic headgear or it may be conventionally shaped but larger or smaller than an actual face bow, depending upon the size of the simulated model. Face bow 60 includes an arcuately shaped small inner bow 62 having a left arm 64 and a right arm 66. The terminal end of each arm is adapted to be received by horizontal holes 65–67 previously drilled in the mesial crown portion of each tooth.

The face bow also includes an arcuately shaped large outer bow 68 which is fastened or connected to the extreme front portion of the inner bow. Outer bow 68 includes a rearwardly extending left arm 70 having a hook 72 formed at its terminal end and a similarly extending right arm 74 having a hook 76 formed at its terminal end. The arms of the outer bow extended from the interior space between walls 16–18 through rectangular openings 54–56 to the area outwardly of the sidewalls.

External forces simulating the forces exerted on the outer bow by headgear apparatus are applied to the outer bow by coil tension springs 78–80. Coil spring 80 has one end suitably secured to a movable slide member 82. The other end of spring 80 includes a hook 81 which may be selectively inserted in any one of a number of openings 85 provided in a perforated strap 84. By inserting hook 81 in different openings, the magnitude of the spring tension may be varied. The free end of strap 84 is connected to outer bow hook 76 by a connecting wire 88 having an extension 89. In a similar manner, coil spring 78 is secured to a slide member 84, a perforated strap 83, a connecting wire 86, having an extension 87 and to outer bow end 72. Springs 78–80 are sufficiently tensed to exert a moderate pull on the outer bow. This force is transmitted to the teeth by inner bow 62.

Referring now specifically to FIG. 3, movable slides 82–84 are shown in their upper positions. In this position, the forces exerted on the teeth by springs 78–80 extend along a line defined by extensions 87–89. It may be observed that extensions 87–89 define a line extending below a geometric point 90 on the teeth, known as the center of resistance. By exerting the force below the center of resistance a counterclockwise movement is established and distal tipping of the crown is achieved. The distal tipping may be more clearly observed by providing the tooth with a centerline 92 and comparing the inclination of the centerline with the horizontal and vertical lines of a stationary graph 94 inscribed on the transparent side walls as seen in FIG. 5.

Slides 82–82' are each similarly constructed and comprise double wall tracks 89' secured to the back surface of rear wall 14. Vertically extending rectangular openings 90' are provided through the rear wall at each track to accommodate springs 78–80. As best seen in FIGS. 2 and 3 the locus of the track walls generally describe a radius equal to the combined length of a spring 80, strap 84 and wire 88. Thus, as the movable slide member is moved anywhere along the track from top to bottom, springs 78–80 are similarly tensed, although the direction from which the force is exerted is drastically changed. If desired, a number of detents may be provided along various positions of the slide track.

Turning now to FIG. 4, the movable slide members are shown in their lower position so that the line of force is applied above the center of resistance. Under these conditions the orthodontist may demonstrate that crown tipping results. It may also be demonstrated that application of force from the lower position tends to extract the tooth from the jaw. In the solid line and phantom views of FIG. 5, the difference in tooth movement depending upon the origin of the external force, is clearly illustrated with the aid of graph 94.

In addition to changing the direction from which the force is applied, various reactions can be obtained by removing the face bow from the teeth and from the ends of wires 86–88 and bending the inner bow relative to the outer bow to change the effect of force angle in a manner similar to that which may actually be done by the orthodontist. Upon reattachment of the face bow, the changes in the tooth position may be observed for a given face bow modification.

As noted above, the magnitude of the force applied by springs 78 and 80 may be varied by changing the ends of the springs connected to straps 83 and 84 to any of the various openings provided therealong. In addition, although not shown on the drawings, the spring force may be applied directly backwards rather than upwardly or downwardly to demonstrate bodily distal movement of the tooth.

By means of the invention, each of the movements can be accurately shown and illustrated to thereby allow a vehicle for experimentation by the orthodontist and provide a quick facility for acquainting the patient with the results which may be expected when employing the various headgear.

It is obvious that upon study by those skilled in the art the disclosed invention may be altered or modified both in its physical appearance and construction without departing from its inventive concept. Therefore, the scope of protection to be given the invention should not be limited by the embodiment described above, but should be determined by the essential description thereof which appears in the appended claims.

We claim:

1. An orthodontic model comprising a tooth full view including a vertical support means for independently supporting the tooth in a manner simulating support thereof in a patient's mouth and permitting tooth displacement responsive to application of external force and extraoral means for applying external force to said tooth.

2. An orthodontic model as set forth in claim 1 wherein said extraoral means comprise: a conventionally shaped orthodontic face bow cooperating with said tooth and wherein said external force is applied through said face bow.

3. The orthodontic model as set forth in claim 1 wherein said support means comprise resilient elements supporting said tooth in a position it would normally assume without application of external force.

4. The orthodontic model as set forth in claim 3 wherein said resilient support elements permit vertical and horizontal movements of the tooth in a vertical plane and permit pivotal tooth movement about a horizontal axis.

5. The orthodontic model as set forth in claim 1 including additionally: means facilitating visual observation of said tooth displacement.

6. The orthodontic model as set forth in claim 1 wherein said extraoral means include: means for varying the magnitude of the external force applied to said tooth.

7. The orthodontic model as set forth in claim 1 wherein said extraoral means include: means for varying the direction of the external force applied to said tooth.

8. The orthodontic model as set forth in claim 1 wherein said extraoral means comprise: a conventionally shaped orthodontic face bow comprising an inner bow cooperating with said tooth and an extraoral outer bow, and means cooperating with an end of the extraoral bow for varying the magnitude and direction of the external force applied thereto.

9. The orthodontic model as set forth in claim 8 including means attaching the inner bow to the tooth in a manner permitting convenient removal thereby facilitating adjustment of the inner bow relative to the outer bow.

10. The orthodontic model as set forth in claim 9 including additionally: cross hatch means mounted adjacent said tooth to facilitate comparison of the displaced position of said tooth relative to its normal position responsive to application of the external force.

11. An orthodontic force model comprising: a pair of spaced apart left and right molars simulating the similarly located molars on each side of the medial line of a human jaw; means supporting said molars for displacement responsive to application of external force thereto and extraoral means for applying force to said molars.

12. The orthodontic force model as set forth in claim 11 including additionally: means coupling said molars for conjoint movement and wherein the external force is applied to said molars through said coupling means.

13. The orthodontic force model as set forth in claim 11 including additionally: means for varying the direction of the external force applied to said molars.

14. The orthodontic force model as set forth in claim 11 including additionally: means for varying the magnitude and direction of the external force applied to said molars.

15. The orthodontic force model as set forth in claim 14 including additionally: means coupling said molars for conjoint movement and wherein the external force is applied to said molars through said coupling means.

16. The orthodontic force model as set forth in claim 15 wherein said coupling means comprise a conventionally shaped orthodontic face bow having an inner bow connected to said molars and an outer bow.

17. The orthodontic force model as set forth in claim 16 including means removably connecting the inner bow to said molars facilitating adjustment of the inner bow relative to the outer bow.

18. The orthodontic force model as set forth in claim 15 wherein said molars are suspended by a plurality of springs simulating support thereof in a human jaw.

19. The orthodontic force model as set forth in claim 18 including additionally: graph means disposed adjacent the molars to facilitate comparison of the molar position with application of external force vis-a-vis the molar position without application of external force.

20. An orthodontic force model comprising: a frame including a pair of spaced apart support members; at least two simulated teeth comprising similarly located teeth on opposite sides of the medial line of a human jaw; means supporting one of said teeth for independent movement on each support member, and extraoral means for applying an external force to said teeth thereby effecting displacement of said teeth from their normal position.

21. The orthodontic force model as set forth in claim 20 wherein said extraoral means comprise a conventionally shaped orthodontic face bow comprising an inner bow removably connected to said teeth and an outer bow; said outer bow having its terminal ends connected to tension springs; and wherein said support numbers comprises a pair of spaced apart transparent walls enabling clear observation of tooth displacement.

22. The orthodontic force model as set forth in claim 21 including additionally: means for varying the magnitude and direction of the force applied to the outer bow.

23. The orthodontic force model as set forth in claim 22 further including graph means carried on at least one wall juxtaposition a tooth supported thereat for facilitating comparison of the normal position of said tooth without external force applied thereto and the relative displacement of said tooth responsive to application of external force.

* * * * *